Oct. 31, 1950

R. H. GODDARD 2,528,133

COMBINED AIR AND FUEL CONTROL VALVE
FOR RESONANCE COMBUSTION CHAMBER

Filed Nov. 30, 1946

INVENTOR.
Robert H. Goddard, Dec'd
Esther C. Goddard, Executrix
BY
Chas. T. Hawley ATTY.

Patented Oct. 31, 1950

2,528,133

UNITED STATES PATENT OFFICE 2,528,133

COMBINED AIR AND FUEL CONTROL VALVE FOR RESONANCE COMBUSTION CHAMBER

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application November 30, 1946, Serial No. 713,313

4 Claims. (Cl. 60—44)

This invention relates to resonance combustion chambers adapted for use in rocket craft and of the general type shown in the prior Goddard Patent No. 1,980,266. In such resonance combustion chambers, the air supply is controlled by a plurality of air valves which periodically interrupt the flow of air in the air intake passage. Fuel is admitted in timed relation to the in-flow of air.

It is the general object of this invention to provide an improved air valve construction which also directly controls the admission of fuel. In the preferred construction, liquid fuel, as gasoline, is admitted through ports in the pivotal supports of the air valve members, and the valve members themselves directly control the fuel admission ports.

The invention further relates to arrangements and combinations of parts which will be hereinafter described and more particularly pointed out in the appended claims.

A preferred form of the invention is shown in the drawing, in which

Figure 1:
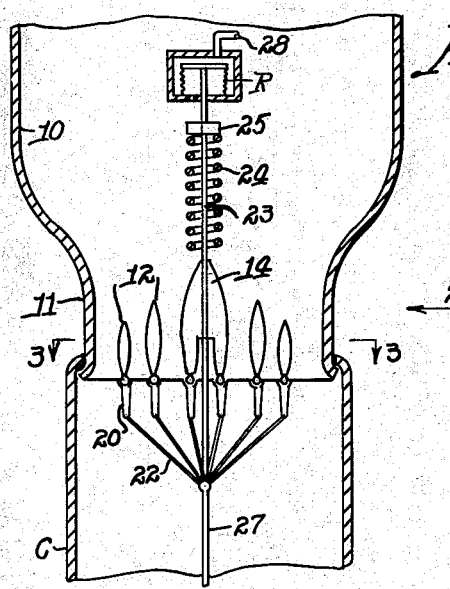
Fig. 1 is a sectional side elevation of a portion of a resonance combustion chamber embodying this invention.
Figure 2:
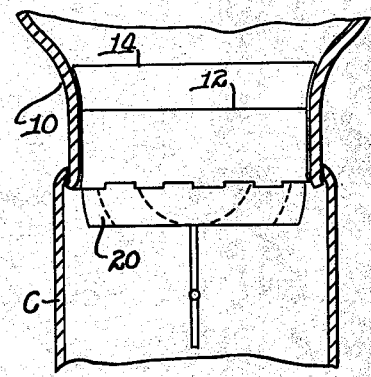
Fig. 2 is a sectional elevation, looking in the direction of the arrow 2 in Fig. 1.

Referring to Figs. 1 and 2, a resonance combustion chamber C is provided with an air intake or funnel 10, and the air passage 11 connecting the intake 10 to the chamber C has a plurality of fixed transverse air vanes 12 and 14, the center vane 14 being of extra width.

Air valve members 20 are pivotally mounted on the vanes 12 and 14, the center vane 14 supporting two air valve members and the members at opposite sides of the intake axis closing in opposite directions.

The air valve members 20 may be connected by links 22 to an actuating rod 23 slidable in the center vane 14. A spring 24 engages a collar 25 on the rod 23 and acts to normally move the valve members 20 to close the passage 11. The links 22 may also be connected by a rod 27 to a valve in the discharge passage of the combustion chamber C, as shown in said prior patent, but this discharge valve forms no part of the present invention.

The valve members 20 may be opened by a bellows operator R supplied with air under pressure from a pipe 28, or may be actuated in any other convenient manner.

Figure 3:
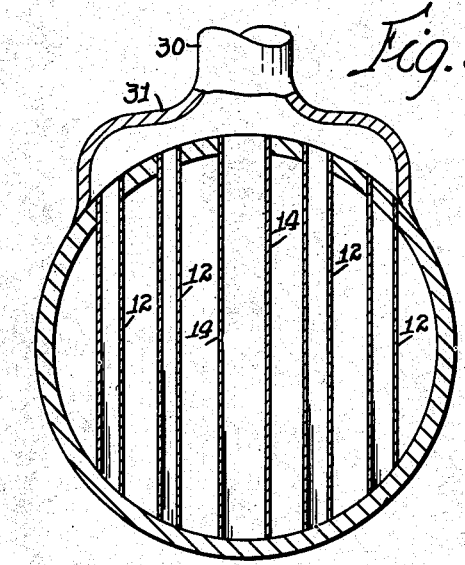
Fig. 3 is a sectional plan view, taken along the line 3—3 in Fig. 1.
Figures 5, 6:
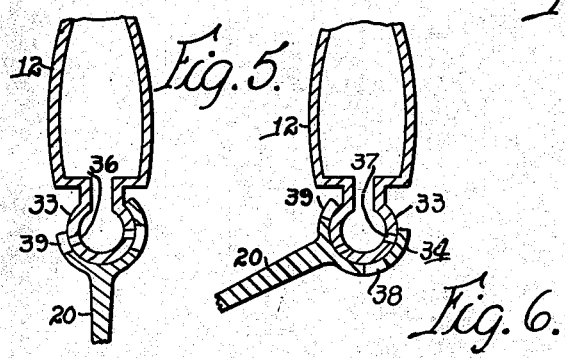
Fig. 5 is an enlarged sectional view of coacting portions of an air vane and the coacting air valve member, with said member in air-admitting position and with the fuel admission ports opened.
Fig. 6 is a similar view but showing the valve member in air-interrupting position and the fuel admission ports closed.

The vanes 12 and 14 are preferably hollow, as shown in Fig. 5, and may be supplied with gasoline or other liquid fuel through an intake pipe 30 (Fig. 3) and a manifold 31. The vanes 12 and 14 are provided with cylindrical bearing supports 33, and each valve member 20 is provided with a coacting bearing portion 34 embracing one of the bearing supports 33 and covering somewhat more than one-half of a circumference.

Each bearing support 33 is provided with ports 36 and 37, and each bearing portion 34 is provided with peripheral slots 38 and 39. The ports and slots are so disposed that when the valve members 20 are in the open position shown in Fig. 5, the ports and slots will be aligned and fuel will be admitted to the chamber C. When, however, the valve members 20 are in the closed position shown in Fig. 6, the ports and slots will be out of alignment and the ports 36 and 37 will be closed. The flow of fuel to the chamber C thus takes place only when the valve members 20 permit full flow of air through the intake passage 11.

Figure 4:
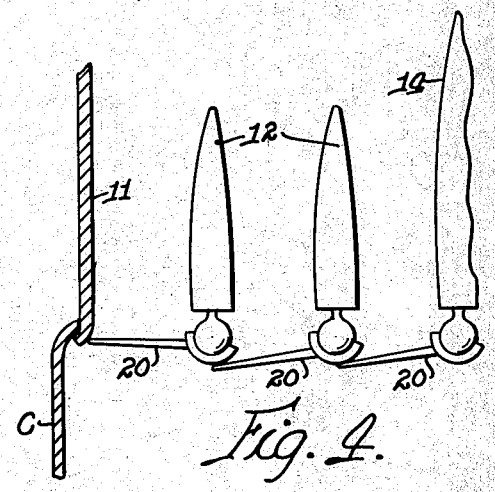
Fig. 4 is an enlarged sectional view showing certain valve members in closed position.
Figure 7:
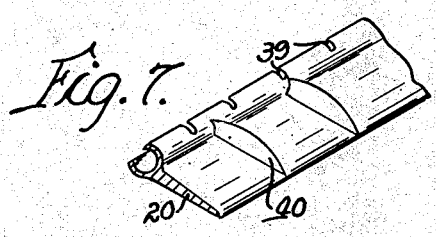
Fig. 7 is a perspective view of a portion of one of the valve members.

It will be noted from Fig. 4 that the free or swinging end of each valve member 20 engages the bearing portion 34 of the next valve member 20 when said members are in closed position. The valve members 20 are preferably relatively thin, as shown in Fig. 7, and are preferably provided with ribs 40 for stiffening purposes.

With the construction above described, it will be seen that the number of moving parts is reduced to a minimum and that the valve members 20 in themselves directly control the admission of both air and fuel.

Having been thus described, the invention is not to be limited to the details herein disclosed, otherwise than as set forth in the claims, but what is claimed is:

1. In resonance combustion apparatus comprising a casing enclosing a combustion chamber, an air intake portion and a tubular portion connecting said air intake portion to said combustion chamber and constituting an air intake passage, that improvement which comprises, a plurality of air valve members extending transversely across said air passage, fixed hollow cylindrical bearing devices for said valve members, and means to feed liquid fuel to said bearing devices, said bearing devices and said valve members having port elements directly coacting to control fuel admission to said chamber from said bearing devices.

2. In resonance combustion apparatus comprising a casing enclosing a combustion chamber, an air intake portion and a tubular portion connecting said air intake portion to said combustion chamber and constituting an air intake passage, that improvement which comprises, a plurality of hollow vanes fixed transversely across said air passage and having hollow cylindrical bearing portions, means to feed liquid fuel to said hollow vanes and bearing portions, and air valve members pivotally mounted on said bearing portions and angularly movable to opened and closed positions, said bearing portions and said valve members having directly coacting ports controlling fuel admission to said chamber from said hollow vanes.

3. In resonance combustion apparatus comprising a casing enclosing a combustion chamber, an air intake portion and a tubular portion connecting said air intake portion to said combustion chamber and constituting an air intake passage, that improvement which comprises, a plurality of hollow vanes fixed transversely across said air passage and having hollow cylindrical bearing portions, means to feed liquid fuel to said hollow vanes and bearing portions, and air valve members pivotally mounted on said bearing portions and angularly movable to opened and closed positions, said bearing portions having fuel admission ports and said valve members having slots and port-closing portions so related angularly to said fuel admission ports that said ports are closed when the air passage is closed by said valve members.

4. In resonance combustion apparatus comprising a casing enclosing a combustion chamber, an air intake portion and a tubular portion connecting said air intake portion to said combustion chamber and constituting an air intake passage, that improvement which comprises, a plurality of hollow vanes fixed transversely across said air passage and having hollow cylindrical bearing portions, means to feed liquid fuel to said hollow vanes and bearing portions, and air valve members pivotally mounted on said bearing portions and angularly movable to opened and closed positions, said bearing portions each having angularly separated fuel admission ports and said valve members having angularly separated slots and associated port-closing portions so related angularly to said fuel admission ports that said ports are closed when the air passage is closed by said valve members, and that said ports are open when said air passage is open.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,980,266 | Goddard | Nov. 13, 1934 |
| 2,224,472 | Chandler | Dec. 10, 1940 |
| 2,250,932 | Kittler | July 29, 1941 |
| 2,269,705 | Besler | Jan. 13, 1942 |